April 11, 1950      J. MIHALYI      2,503,756

FILM SPOOL WITH SIGNAL FOR CAMERAS

Filed Jan. 8, 1947

JOSEPH MIHALYI
INVENTOR

BY
ATTORNEYS

Patented Apr. 11, 1950

2,503,756

UNITED STATES PATENT OFFICE 2,503,756

FILM SPOOL WITH SIGNAL FOR CAMERAS

Joseph Mihalyi, Rochester, N. Y., assignor to Eastman Kodak Company, Rochester, N. Y., a corporation of New Jersey Application January 8, 1947, Serial No. 720,767

2 Claims. (Cl. 242—70)

This invention relates to photography and more particularly to film spools on which convolutions of film may be wound. One object of my invention is to provide a spool particularly adapted for use with film for a camera utilizing only a single film spool, the film being wound from and to the spool to make exposures. One of the objects of my invention is to provide a signal which will indicate to an operator when film on the spool has been exposed. Another object of my invention is to provide a signal which also serves as a centering means for the film spool. A still further object of my invention is to provide a film spool with a signal which will not interfere with the spools being placed on developing hangers. Other objects will appear from the following specification, the novel features being particularly pointed out in the claims at the end thereof.

It is not broadly new to provide a film spool with a signal which is automatically actuated by placing the spool in a camera which will notify an operator as to whether or not the film on the spool has been exposed. Such an exposure-indicating spool is shown in my Patent No. 2,367,514, granted January 16, 1945. Such spools are particularly useful in cameras of the type shown in my Patent No. 2,336,278, Film Winding Apparatus, granted December 7, 1943. However, with the film spool of my present embodiment, no additional part need be added to the spool so that the signal is inexpensive and, in addition, the construction of the signal is such that it must be assembled when the spool is assembled and there is no danger of failure to include a signal which has to be separately assembled. Moreover, my improved form of signal is adapted for other purposes besides signaling, such as forming a spool center for one end of the spool on which it may turn. Referring now to the drawings wherein like reference characters denote like parts throughout:

My invention comprises incorporating in one of the flanges an integrally-formed member which is bendable to and from a signally position; this bendable member also including a means for properly positioning the spool on a film-winding shaft.

Figure 1:
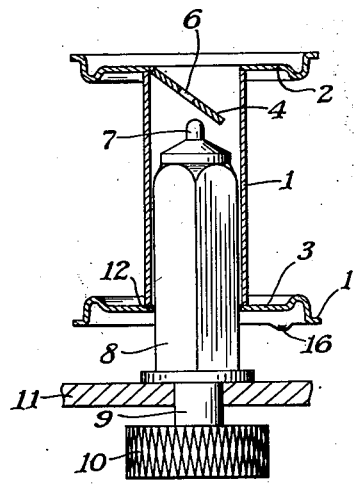
Fig. 1 is a sectional view through a spool provided with a signal constructed in accordance with and embodying a preferred form of my invention, the spool being shown as it is inserted upon a spool shaft in a camera with the signal in a signaling position to indicate that the film has not yet been exposed.
Figure 5:
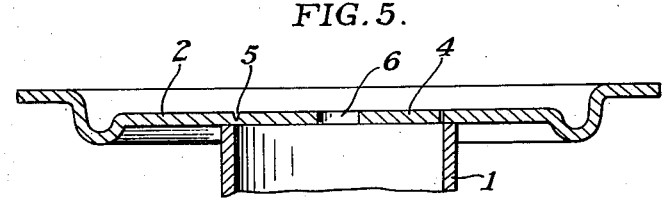
Fig. 5 is an enlarged fragmentary sectional view through a portion of one of the film spool flanges showing the construction of the signaling flap.

More specifically, a preferred form of spool may consist in a tubular core 1 having flanges 2 and 3 spot-welded or otherwise attached to the core 1. The flange here shown as the upper flange 2 is preferably provided with a signaling flap 4 which is punched out of the metal of which the flange 2 is made except for a weakened line 5 which is made by striking the metal with a tool, materially thinning the metal at this point, as indicated in Fig. 5. The spool flange 2 is preferably made of a metal which is non-springy so that it will retain the shape into which it is bent, and the flap 4 goes to the customer bent down at an angle so as to lie at least partially inside of the tubular core 1, as indicated in Fig. 1. This will indicate to the customer that film, wound upon the spool, has not yet been exposed.

Figure 3:
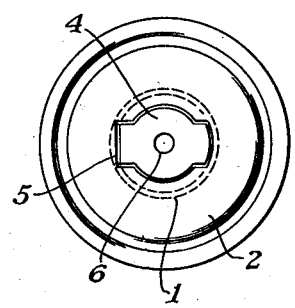
Fig. 3 is a top plan view of the spool shown in the preceding figures.
Figure 4:
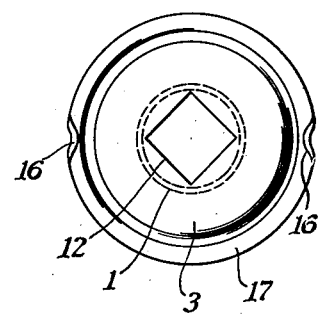
Fig. 4 is a bottom plan view of the spool shown in the preceding figures.

As indicated in Fig. 3, the flap 4 is provided with a central aperture 6 of a size to fit the upstanding end 7 of a film-supporting shaft which is preferably provided with a squared lower end 8 and which may be attached to shaft 9 which may be turned by a camera-winding knob 10. The shaft 9 preferably passes through a portion of a camera body 11.

The lower flange 3 is provided with a squared opening 12 to fit the squared end 8 of the spool-supporting shaft. Thus, when the winding knob 10 is turned, the spool will be turned to propel film from the spool through a camera in the manner described in my Patent 2,336,278, above referred to.

Figure 2:
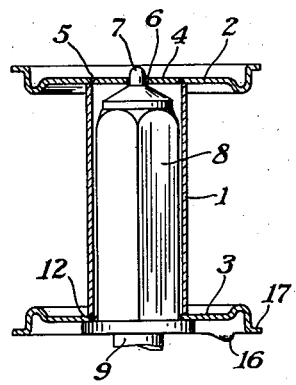
Fig. 2 is a view similar to Fig. 1 but with the spool and signal in its loaded position in which the signal will indicate to an operator that the film has been exposed.

When the spool is loaded into the camera and moved from the position shown in Fig. 1 to the position shown in Fig. 2, the bendable flap 4 is bent from its signaling position to a non-signaling position in which it lies substantially flush with the central plane of the flange 2, as indicated in Fig. 2. In bending the flap upwardly, as the spool is pressed downwardly on the supporting shaft, the hinge flap 4 is caused to move about the weakened line 5 so that the aperture 6 will lie on the axis of the core 1 and the film spool will be supported by the narrow end 7 of the supporting shaft. Thus, the spool will turn accurately on the axis of the cam shaft in winding and unwinding the film.

Figure 6:
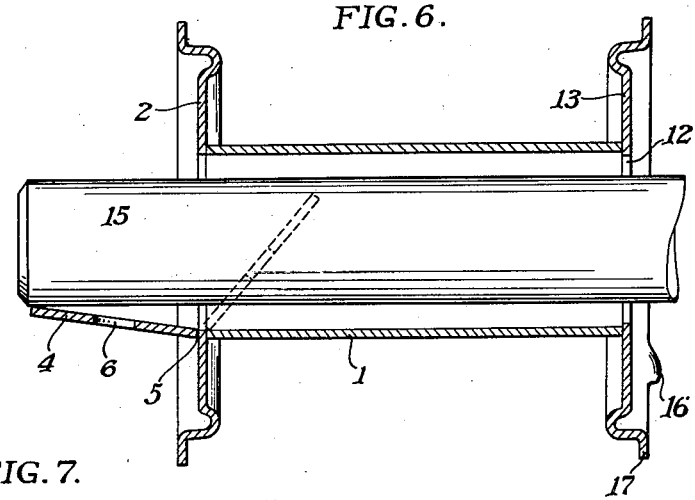
Fig. 6 is a view showing a side elevation of a spool mounted on a processing rod.
Figure 7:
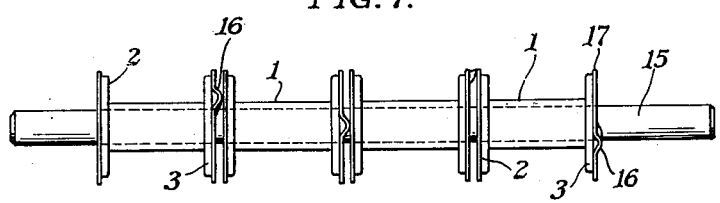
Fig. 7 is a side elevation of a number of spools mounted on a processing rod.

When the convolutions of film have been exposed and the film spool is removed, since the flap 4 lies flush with the spool flange 2, it will indicate to an operator that film has been exposed. The film will then be sent to a processing station where a number of the film spools will be loaded upon a developing hanger. As indicated in Fig. 6, a hanger rod 15 is pushed through one or more of the film reels and, as the rod reaches the bendable flap 4, it will bend this flap outwardly, as indicated in Fig. 6, through some 90 degrees, so that the hinge flap 4 will break off along the weakened line 5. If, by any chance, it does not break off, it can readily be pulled off by the operator loading the rod 15. A series of film spools are preferably loaded on a processing rod 15, as shown in Fig. 7. This figure also shows that one flange 3 of each spool is provided with one or more upstanding bent-out portions 16, so that the flanges of the film spool will not come into contact when they are arranged on a rod; this being an advantage because it will permit the solutions to pass from between the pairs of closely-spaced spool flanges, as indicated in Fig. 7. The spacing lugs 16 are preferably struck from the periphery 17 of the flange 3, and it is usually desirable to provide a pair of these members spaced apart 180 degrees. If desired, of course the spacing lugs 16 could be placed on the flanges 2, or, for that matter, on both of the flanges 2 and 3, although it is only necessary to provide these on one of the flanges, as is evident from Fig. 7.

With my improved form of film spool, the signaling flap can be formed without added expense, except for the expense of the tool for perforating the flap and the tools which also form the weakened line 5. It is made integral with the flange 2 in the present instance, and the aperture 6 accurately positions the film spool on the supporting shaft. Not only is this form of signaling and centering device simple to make, but it is quite foolproof since the machines for making the flange 2 can form this hinge signal inwardly into the position shown in Fig. 1, so that there is no chance that the signal may be omitted, or improperly positioned, when the film cartridge is prepared. Moreover, it takes relatively light pressure on the film spool to properly position it on the camera supporting shaft, and to bend the signal into its film-guiding position, as shown in Fig. 2. Thus, my improved form of signaling and centering means overcomes the objections of added expense and, in addition, serves to accurately guide the film spool so that it will turn about the axis of the core.

I claim:

1. A film spool for film cartridges including a spool with convolutions of film wound thereon comprising a core, flanges attached to both ends of the core, openings in the flange to receive a film-supporting shaft, one flange including a bendable flap normally lying inside the core and at an angle to the axis of the core but movable therefrom into a position substantially flush with the flange when inserted on the shaft, said bendable flap including a bearing aperture to center the flange on the shaft.

2. A film spool for cartridges including a spool having convolutions of film wound thereon and adapted for use on a shaft including a polygonal shaft terminating in a rounded end, said spool comprising a tubular core, flanges attached to the core, one at each end, one flange including a polygonal opening to receive the polygonal shaft, the other flange including a flap having a central bearing opening to receive the rounded end of the shaft, and lying at least partially inside of the shaft to be bent therefrom when said spool is inserted on the shaft.

JOSEPH MIHALYI.

REFERENCES CITED

The following references are of record in the file of this patent:

UNITED STATES PATENTS

| Number | Name | Date |
|---|---|---|
| 2,099,646 | Busch | Nov. 16, 1937 |